United States Patent [19]

Forgacs

[11] Patent Number: 5,172,655

[45] Date of Patent: Dec. 22, 1992

[54] FUEL SPECIFYING APPARATUS

[75] Inventor: Robert L. Forgacs, Dearborn Heights, Mich.

[73] Assignee: Ford Motor Company, Dearborn, Mich.

[21] Appl. No.: 832,459

[22] Filed: Feb. 7, 1992

[51] Int. Cl.⁵ ............................................. F02B 75/12
[52] U.S. Cl. ..................................... 123/1 A; 123/494; 123/575
[58] Field of Search ............... 123/1 A, 575, 494, 417, 123/480

[56] References Cited

U.S. PATENT DOCUMENTS

| | | | |
|---|---|---|---|
| 2,170,722 | 8/1939 | Mainzer | 70/179 |
| 3,845,877 | 11/1974 | Ainett et al. | 220/86 |
| 4,031,864 | 6/1977 | Crothers | 123/57 S |
| 4,072,850 | 2/1978 | McGlynn | 364/424.04 |
| 4,253,428 | 3/1981 | Billings | 123/1 A |
| 4,369,736 | 1/1983 | Ito | 123/1 A |
| 4,467,937 | 8/1984 | Shaw | 220/246 |
| 4,594,968 | 6/1986 | Degobert et al. | 123/1 A |
| 4,682,293 | 2/1987 | Goldenberg | 123/57 S |
| 4,706,630 | 11/1987 | Wineland et al. | 123/478 |
| 4,817,813 | 4/1989 | Krause | 220/86 |
| 4,821,697 | 4/1989 | McDougal | 123/198 D |
| 4,854,286 | 8/1989 | Chemnitzer | 123/1 A |
| 4,909,225 | 3/1990 | Gonze et al. | 123/494 |
| 4,993,391 | 2/1991 | Kuribara | 123/1 A |

Primary Examiner—E. Rollins Cross
Assistant Examiner—Erick Solis
Attorney, Agent, or Firm—Roger L. May; Peter Abolins

[57] ABSTRACT

A fuel specifying apparatus is provided for allowing a person adding fuel to the fuel tank of a vehicle to specify to the vehicle's engine control computer the composition of the fuel being added. The engine control computer uses this information to calculate the average fuel composition in the fuel tank following refueling. In addition, means for reminding the refueling person to specify to the engine control computer the composition of the fuel to be added before adding the fuel to the fuel tank are also provided.

17 Claims, 5 Drawing Sheets

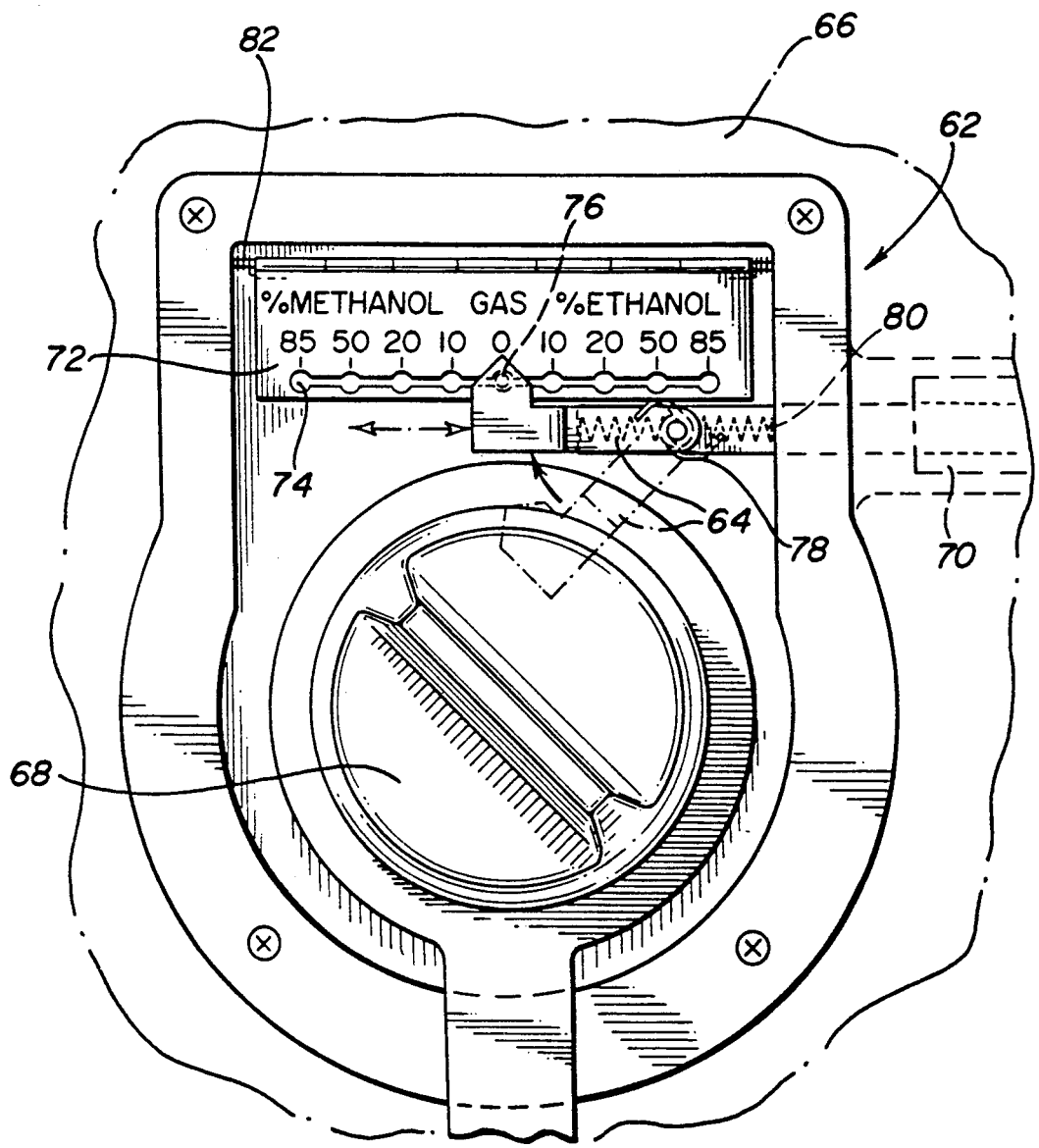

FUEL SPECIFYING APPARATUS

BACKGROUND OF THE INVENTION

The present invention relates to a means for providing fuel composition information to a vehicle engine control computer to facilitate the use of alternate fuel mixtures in internal combustion engines, and to a means for reminding the person refueling the vehicle to provide the requisite fuel composition information to the engine control computer before adding fuel to the vehicle.

It is well known that ever tighter emissions regulations and petroleum depletion have prompted research into the feasibility of using alternative fuels in internal combustion engines. Currently, ethanol/gasoline and methanol/gasoline mixtures are among the alternative fuel possibilities being considered.

Alternative fuel mixtures exhibit physical properties and performance characteristics which are different from pure gasoline, including dissimilar combustion burn rates, volumetric energy content, vapor pressures, octane ratings, and heats of vaporization. The operating parameters of internal combustion engines utilizing alternative fuels must be adjusted to accommodate such differences in order for such engines to operate efficiently. The operating parameters which must be adjusted include the air bypass, fuel flow, spark timing, and air/fuel ratio.

The aforementioned adjustments can be made automatically by an engine control computer. Engine control computers are well known and are commonly used in vehicles. See, for example, U.S. Pat. No. 4,706,630 to Wineland et al. However, in order for an engine control computer to make accurate adjustments, certain information concerning the composition of the fuel being burned in the engine, such as alcohol fraction, should be known by the computer. To the extent that erroneous fuel composition information is sent to the computer, adjustments made to the engine will be improper. Improper engine adjustments, in turn, result in poor engine performance and excessive emissions. Thus, accurate fuel composition information is important to the viability of alternative fuel use in internal combustion engines.

The current method of providing fuel composition information to engine control computers is through the use of in-line fuel sensors which exploit differences in physical properties between gasoline and ethanol or methanol to measure the instantaneous composition of fuel flowing past the sensor. The sensor then sends a signal to the computer which corresponds to the composition of the fuel flowing past the sensor. An example of this method is found in U.S. Pat. No. 4,594,968 issued to Degobert et al. wherein the composition determination of an alcohol-gasoline mixture is based on the degree to which light is absorbed by the mixture. This information is then sent to an engine control means.

Another example is found in U.S. Pat. No. 4,909,225 to Gonze et al. which discloses the use of a sensor such as a capacitive dielectric sensor to determine the composition of a fuel mixture. This information is used to control the operating parameters of an internal combustion engine.

Though potentially very useful, currently available fuel sensors are inherently inaccurate and unreliable. The distance between the sensor and the intake manifold of the engine means that the composition of the fuel being instantaneously sensed by the sensor is different from the fuel actually flowing into the engine. The engine control computer will thus adjust the engine to accommodate the fuel being instantaneously sensed, but the composition of this fuel can often be different from the fuel actually being combusted in the engine. In addition, when multicomponent fuel is agitated, an emulsion forms under certain conditions which degrades fuel sensor accuracy, thereby resulting in an erroneous signal being sent to the engine control computer.

Additional inaccuracies exhibited by currently available fuel sensors stem from the environment in which they operate. Foreign materials accumulate on the sensing surfaces over time and continually degrade the fidelity of the signal sent to the computer. Temperature variations in the fuel and mechanical stress on the sensor also tend to adversely affect the signal.

Accordingly, it is seen that the need exists in the art for more accurate and reliable means for informing engine control computers of the composition of fuel being introduced into the internal combustion engine of a vehicle. Such a need, if fulfilled, would facilitate the use of alternative fuels in vehicles by allowing internal combustion engines to efficiently operate on such fuels, resulting in improved engine performance and decreased pollution.

SUMMARY OF THE INVENTION

That need is met by the present invention which provides means for allowing a person adding fuel to the fuel tank of a vehicle to specify to the vehicle's engine control computer the composition of the fuel being added. The engine control computer uses this information, along with the total quantity of fuel added to the fuel tank and the composition and quantity of fuel existing in the fuel tank prior to refueling, if any, to calculate the average fuel composition in the fuel tank following refueling. The average value is particularly sufficient when homogenization measures are taken in the fuel tank. In addition, the present invention provides means for reminding the refueling person to specify to the engine control computer the composition of the fuel to be added before adding the fuel to the fuel tank.

The present invention generally provides a fuel specifying apparatus for a vehicle having an internal combustion engine and a fuel tank housed within the vehicle which has an inlet thereto and a fuel cap at the inlet. The fuel specifying apparatus comprises an engine control computer and means for manually specifying to the engine control computer the composition of fuel added to the fuel tank. Preferably, the apparatus further comprises means for ensuring that the composition of fuel to be added to the fuel tank is specified to the engine control computer before the fuel is added to the fuel tank. The ensuring means can include means for interfering with fuel additions to the fuel tank unless and until the composition of fuel to be added is specified to the engine control computer. Preferably, the means for interfering with fuel additions comprises means for impeding the removal of the fuel cap. The impeding means subsequently becomes non-impeding upon specifying to the vehicle engine control computer the composition of fuel to be added to the fuel tank.

According to a more specific aspect of the present invention, a fuel specifying apparatus is provided for a vehicle capable of accepting fuels of differing composition, where the vehicle has an internal combustion engine, an engine control computer, and a fuel tank with an inlet and a fuel cap at the inlet. The fuel specifying apparatus comprises a plurality of actuators mounted on the vehicle near the fuel cap. Each actuator corresponds to a predetermined fuel composition type and each, when activated, causes a distinctive electrical signal to be transmitted to the engine control computer. Preferably, the fuel specifying apparatus includes means for ensuring that the composition of fuel to be added to the fuel tank is specified to the engine control computer before the fuel is added to the fuel tank. The ensuring means may include a spring attached to a moveable member for holding the moveable member in an initial position to impede the removal of the fuel cap unless and until the composition of fuel to be added is specified to the engine control computer. The ensuring means preferably further includes means to return the moveable member to the initial position to impede the removal of the fuel cap following the addition of fuel to the fuel tank.

In accordance with another aspect of the present invention, the fuel specifying apparatus comprises a moveable member mounted upon the vehicle adjacent the fuel cap and means for specifying to the engine control computer the composition of fuel added to the fuel tank by varying the position of the moveable member.

Accordingly, it is an object of the present invention to provide more accurate and reliable means for conveying to vehicle engine control computers the composition of fuel being introduced into the internal combustion engines of vehicles to facilitate the use of alternative fuels in vehicles.

It is a further object to provide means for allowing a person adding fuel to the fuel tank of a vehicle to specify to the vehicle's engine control computer the composition of the fuel being added.

It is a further object to provide means for reminding the refueling person to specify to the engine control computer the composition of the fuel to be added before adding the fuel to the fuel tank.

These and other objects and advantages of the present invention will become apparent from the following detailed description, the accompanying drawings, and the appended claims.

BRIEF DESCRIPTION OF THE DRAWINGS

FIG. 6 is an elevational view of a third version of the present fuel specifying apparatus.

DETAILED DESCRIPTION OF THE PREFERRED EMBODIMENTS

Figure 1:
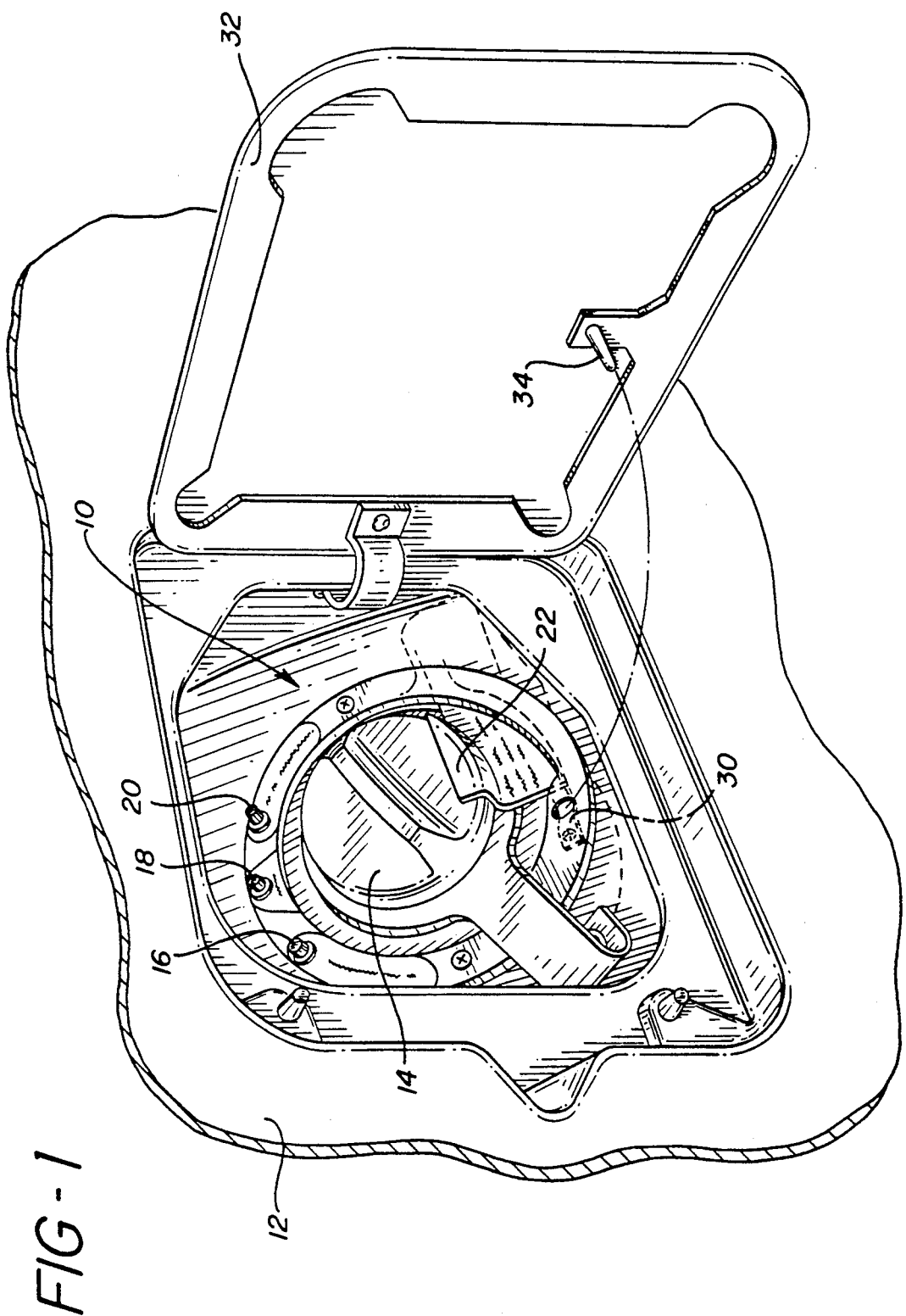
FIG. 1 is a perspective view of one version of the present fuel specifying apparatus affixed to a vehicle in the vicinity of the vehicle's gas cap and refueling access door.
Figure 2:
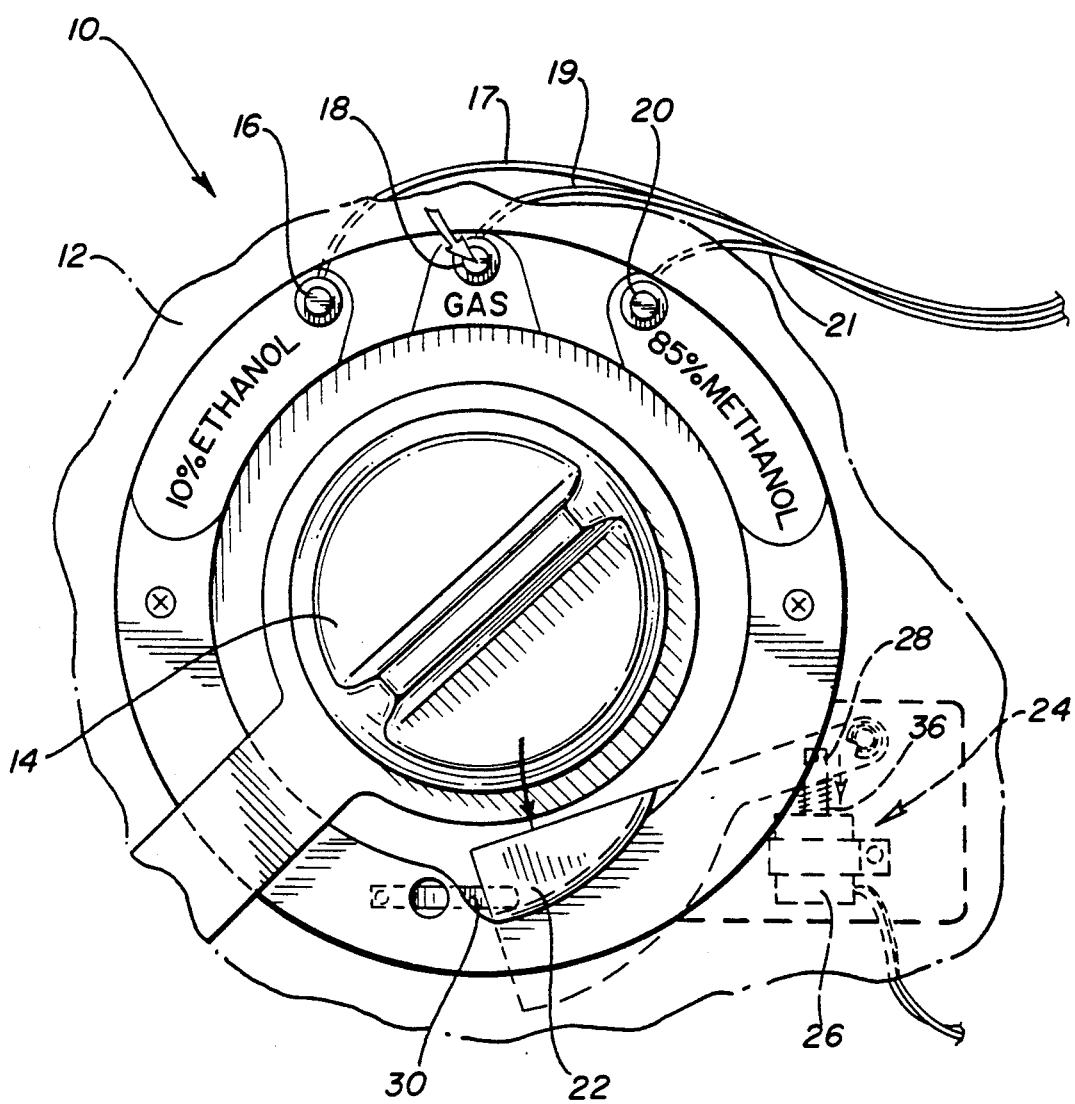
FIG. 2 is a more detailed view of the fuel specifying apparatus depicted in FIG. 1.
Figure 3:
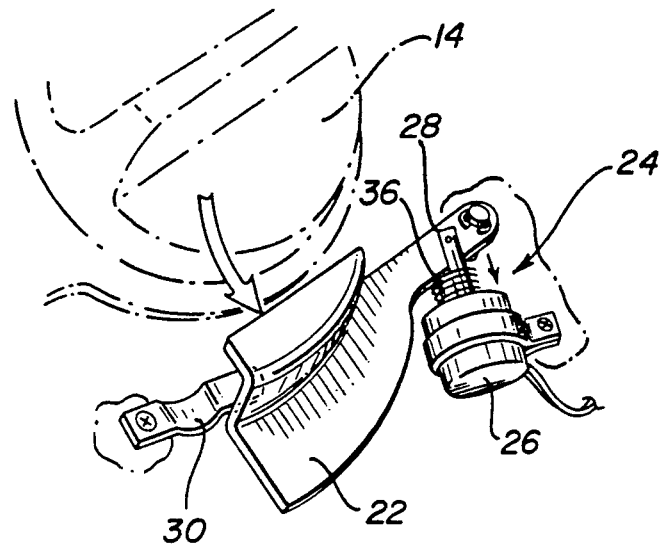
FIG. 3 is a detailed view of the moveable member, latch, and solenoid shown in FIG. 2.

Referring now to FIGS. 1, 2, and 3, one embodiment of the present fuel specifying apparatus will be described. Fuel specifying apparatus 10 is shown in FIG. 1 affixed to vehicle 12. Vehicle 12 can be any type of vehicle having an internal combustion engine, a fuel tank with an inlet thereto and a fuel cap 14 covering the inlet, and the capability to accept fuels of differing composition. Fuel specifying apparatus 10 generally includes an engine control computer and means for manually specifying to the engine control computer the composition of fuel added to the fuel tank. As illustrated in FIGS. 1 and 2, such means include actuators 16, 18, and 20 mounted on vehicle 10 adjacent fuel cap 14. Preferably, actuators 16, 18, and 20 are spring loaded, push button switches.

As shown in FIG. 2, each actuator 16, 18, and 20 corresponds to the predetermined fuel composition types "10% ethanol", "gas," and "85% methanol," respectfully. When activated, each actuator 16, 18, and 20 causes a distinctive electrical signal to be transmitted to the engine control computer of vehicle 12 via wires 17, 19, and 21, respectfully. As will be discussed more fully below, the engine control computer of vehicle 12 is preprogrammed to recognize the following: a signal from actuator 16 corresponds to a fuel consisting of 10% ethanol and 90% gasoline being added to the fuel tank of vehicle 12; a signal from actuator 18 corresponds to a fuel consisting of 100% gasoline being added to the fuel tank; and a signal from actuator 20 corresponds to a fuel consisting of 85% methanol and 15% gasoline being added. It is to be understood that the present fuel specifying apparatus is not limited to the fuel compositions illustrated in FIG. 2, but that any combination of predetermined fuel composition types can be utilized as desired.

Preferably, fuel specifying apparatus 10 further includes means for ensuring that the composition of fuel to be added to the fuel tank of vehicle 12 is specified to the engine control computer thereof before the fuel can be added to the fuel tank. The ensuring means can include means for interfering with fuel additions to the fuel tank, such as by impeding the removal of the fuel cap, unless and until the composition of fuel to be added is specified to the engine control computer.

Such means are illustrated in FIGS. 1, 2, and 3 wherein moveable member 22 is shown pivotably attached to vehicle 12. As shown in FIG. 1, moveable member 22 is oriented in an initial position to impede the removal of fuel cap 14. Preferably, a printed message is provided on moveable member 22 reminding a person about to add fuel to vehicle 12 to specify to the engine control computer the composition of fuel to be added, by activating one of actuators 16, 18, or 20, before adding the fuel. For example, such a printed message could read "FIRST PRESS BUTTON TO SPECIFY FUEL ADDED." The combination of the printed message and the initial position of moveable member 22 to impede the removal of fuel cap 14 ensures that the composition of fuel to be added to the fuel tank of vehicle 12 is specified to the engine control computer thereof before the fuel is added. As soon as one of actuators 16, 18, or 20 is activated, the engine control computer begins the process of calculating a new average fuel composition in the fuel tank of vehicle 12 by immediately taking note of the current fuel volume (if any) in the fuel tank. In this regard, the engine control computer can be informed of the volume of fuel in the fuel tank by any conventional fuel level monitoring device capable of transmitting fuel level information to an engine control computer. The current fuel volume is used to calculate the total volume of fuel added (by subtracting the current fuel volume, if any, from the final volume) and also is needed to calculate the new average fuel composition in the fuel tank after the fuel has been added.

Alternatively, the signal from one of actuators 16, 18, or 20 could be made to reach the engine control computer after fuel has been added. For example, the signal could be withheld until fuel cap 14 has been replaced.

After the composition of fuel to be added has been specified to the engine control computer of vehicle 12, moveable member 22 becomes non-impeding to removal of fuel cap 14. Specifically, when actuator 16, 18, or 20 is activated, an electrical signal is sent to solenoid 24, causing it to become energized. The body 26 of solenoid 24 is rigidly attached to vehicle 12 while the armature 28 of solenoid 24 is pivotably attached to moveable member 22. As shown most clearly in FIG. 3, when solenoid 24 is energized, armature 28 translates in the direction shown causing moveable member 22 to pivot from its initial position impeding the removal of fuel cap 14, to a second position clear of fuel cap 14, as shown in FIG. 3. Once moveable member 22 has pivoted to the second position clear of fuel cap 14, it is held there by latch 30 in the manner shown in FIG. 3. This sequence of events allows fuel cap 14 to be removed in the usual manner so that fuel can be added to the fuel tank of vehicle 12. With the composition of the fuel to be added having been specified to the engine control computer of vehicle 12, the computer will have taken note of the initial fuel volume in the fuel tank (if any), and will monitor the volume in the fuel tank while fuel is being added thereto until fuel addition is complete. Again, any conventional fuel level monitoring/transmitting device can be used for this purpose. When fuel addition is complete, the engine control computer will calculate a new average fuel composition in the fuel tank based upon the initial average composition and volume of fuel in the tank (if any) and upon the volume and composition of the added fuel.

It is preferred that fuel specifying apparatus 10 further include means to return moveable member 22 to its initial position to impede the removal of fuel cap 14 following the addition of fuel to the fuel tank of vehicle 12. As illustrated most clearly in FIG. 1, such means include refueling access door 32 which is pivotably mounted to vehicle 12 for providing access to fuel cap 14, release member 34 which is rigidly attached to refueling access door 32, and spring 36 (shown in FIGS. 2 and 3) which becomes compressed when solenoid 24 causes moveable member 22 to pivot to its second position clear of fuel cap 14. After a person has finished adding fuel to vehicle 12 and has replaced fuel cap 14 over the opening of the fuel tank, that person will close refueling access door 32. This action causes release member 34 to impinge upon latch 30 as shown in FIG. 1. Latch 30 is flexibly mounted to vehicle 12 so that the impingement thereon by release member 34 causes it to flex away from and out of contact with moveable member 22. When this occurs, the compressive force stored in spring 36 forces moveable member 22 to pivot from its second, non-impeding position to its initial position impeding the removal of fuel cap 14. A second function of spring 36 is to hold moveable member 22 in its initial, impeding position. In this manner, when fuel is to be subsequently added to vehicle 12, the person adding the fuel will once again be reminded to specify to the engine control computer the composition of the fuel to be added before adding the fuel to the fuel tank.

Figure 4:
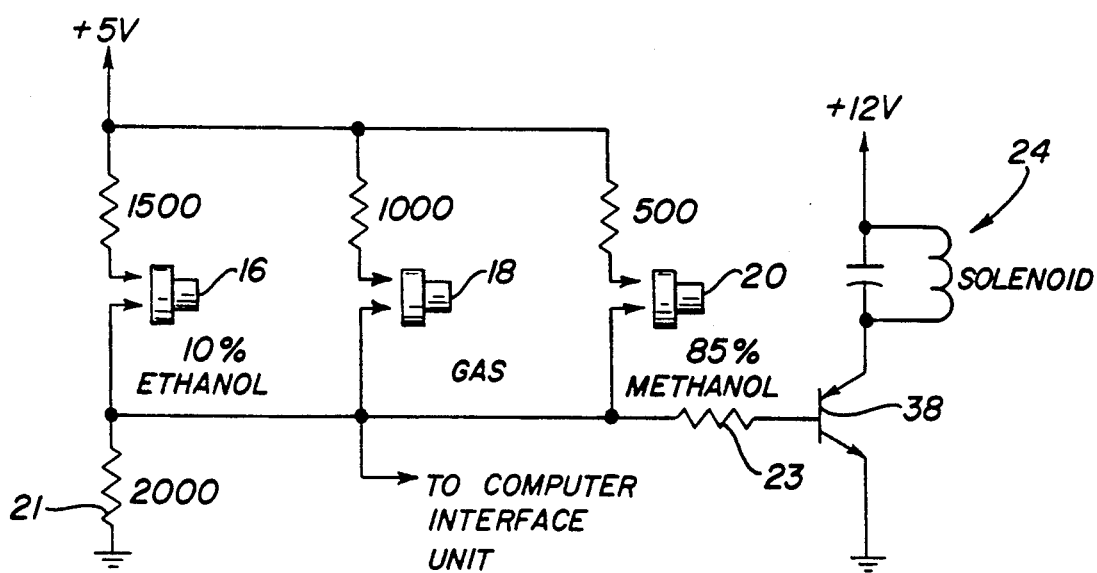
FIG. 4 is a schematic diagram of the circuitry through which the fuel specifying apparatus shown in FIGS. 1 and 2 can communicate with a vehicle engine control computer and also cause the moveable member shown in FIG. 3 to pivot clear of the fuel cap.

Referring now to FIG. 4, a preferred scheme for communicating with the engine control computer of vehicle 12 and for energizing solenoid 24 will be described. Each actuator 16, 18, and 20 is associated with a different resistance. As shown in FIG. 4, for example, actuators 16, 18, and 20 are coupled with resistances of 1500 ohms, 1000 ohms, and 500 ohms, respectively. When the contacts of an actuator close, the associated resistor becomes part of a voltage divider circuit in conjunction with resistor 21. Five volts is applied across this voltage divider circuit. Consequently, a different voltage is transmitted to the engine control computer (via the "computer interface circuit" as shown) depending upon which actuator is activated to complete its respective circuit. As stated above, the engine control computer can be preprogrammed to associate the different voltage values with a specific fuel composition type.

For example, if a person desired to add a fuel to vehicle 12 containing 85% methanol and 15% gasoline, that person would push actuator 20. This would cause a voltage of approximately 4 volts (5 volts times 2000 ohms divided by (500+200) ohms be transmitted to the interface circuit of the engine control computer. The computer will have been preprogrammed to recognize that a 4 volt signal corresponds to a fuel being added to the fuel tank which contains 85% methanol and 15% gasoline. Thus, the composition of the fuel to be added will have been specified to the engine control computer.

In addition to providing communication with the engine control computer, the circuit illustrated in FIG. 4 also facilitates the movement of moveable member 22 from its initial position impeding the removal of fuel cap 14 to its second non-impeding position following the specification to the engine control computer of the composition of fuel to be added. When either actuator 16, 18, or 20 is activated to complete its respective circuit, current flows to transistor 38 via current limiting resistor 23. When this occurs, transistor 38 allows current to pass therethrough from the electrical system of vehicle 12 (represented in FIG. 4 as "+12 V"), thereby energizing solenoid 24. Solenoid 24 is energized only momentarily during the period in which actuators 16, 18, or 20 are activated. However, this is long enough to allow moveable member 22 to be caught by latch 30 and thereby held in its second position clear of fuel cap 14.

Figure 5:
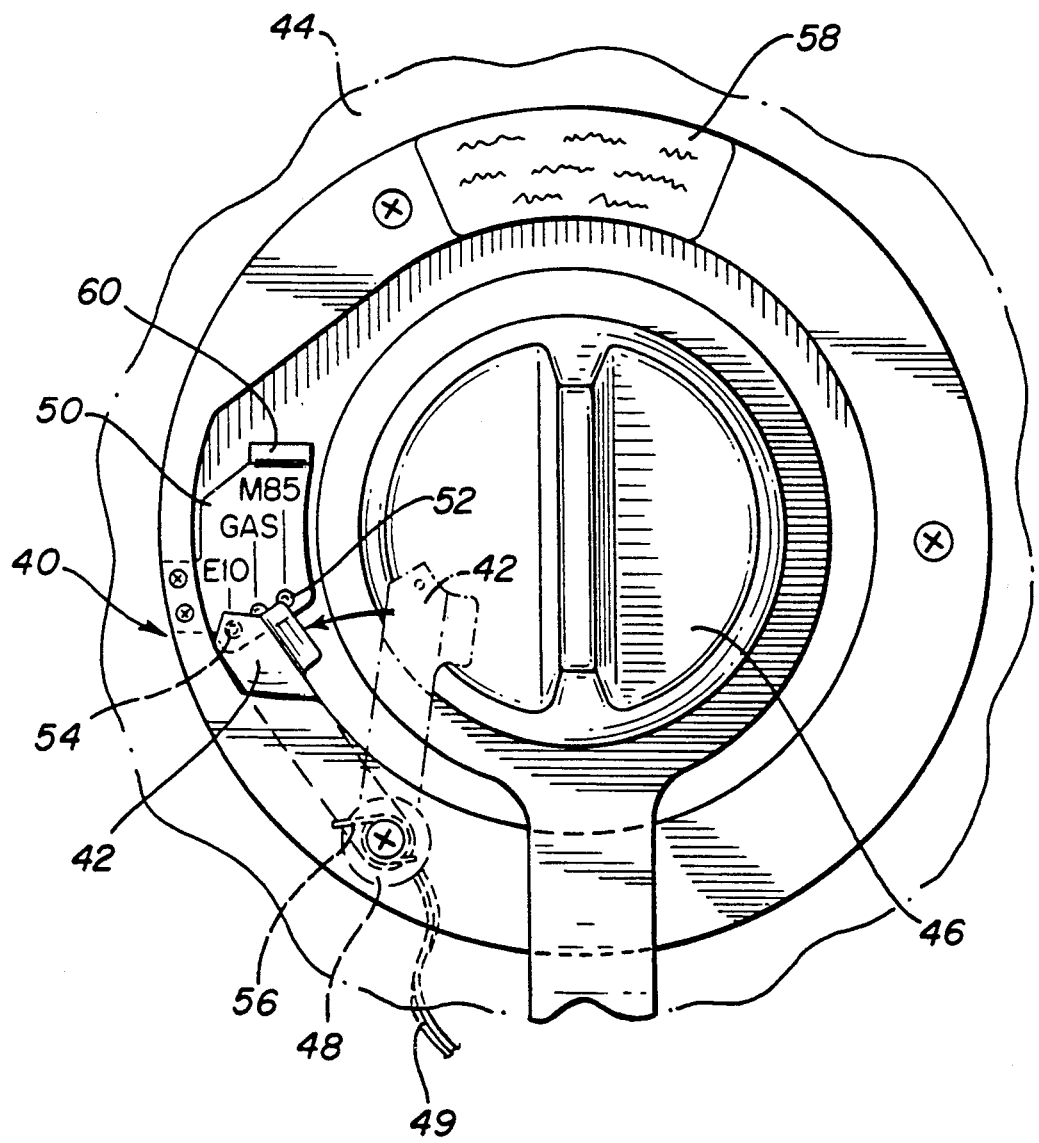
FIG. 5 is an elevational view of a second version of the present fuel specifying apparatus.

Referring now to FIG. 5, a second embodiment of the fuel specifying apparatus of the present invention is illustrated. In accordance with this second embodiment, fuel specifying apparatus 40 includes moveable member 42 pivotably mounted upon vehicle 44 adjacent fuel cap 46, and means for specifying to the engine control computer of vehicle 44 the composition of fuel to be added to the fuel tank thereof by varying the position of moveable member 42. Generally, an electrical signal is transmitted to the engine control computer which varies in accordance with the position of moveable member 42. Moveable member 42 can be placed in predetermined positions, each of which corresponds to different predetermined fuel composition types such that a distinctive fuel identifying signal is transmitted to the engine control computer of vehicle 44 for each fuel composition type selected.

As illustrated, moveable member 42 is pivotably mounted upon rotary potentiometer 48 in such a manner that the resistance thereof varies with the rotational position of moveable member 42. A fraction of the voltage applied across the potentiometer 48, as determined by the rotational position of moveable member 42, is applied to an interface circuit for the engine control computer of vehicle 44 via wires 49. The amperage value of this voltage will be different for each rotational position of moveable member 42 since the resistance of rotary potentiometer 48 will similarly be different. In this manner, the engine control computer of vehicle 44 can be preprogrammed to recognize different fuel composition types based upon the rotational position of moveable member 42.

Means for positioning moveable member 42 in predetermined rotational positions corresponding to different fuel composition types are provided by detent hole plate 50, detent holes 52, and detent 54 (shown in phantom line) affixed to the underside of moveable member 42. Detent hole plate 50 is attached to vehicle 44 adjacent fuel cap 46 and contains a plurality of detent holes 52. Each detent hole 52 corresponds to a specific fuel composition type. As shown in FIG. 5, three fuel composition types and three corresponding detent holes are provided on detent hole plate 50: "M85," which represents a fuel consisting of 85% methanol and 15% gasoline; "GAS," which represents 100% gasoline; and "E10," which represents 10% ethanol and 90% gasoline. The number or type of fuel compositions which can be used with the present fuel specifying apparatus, however, can vary from those illustrated as desired. For example, detent hole plate 50 could be lengthened to accommodate more fuel composition choices and be oriented tangentially or circumferentially with respect to fuel cap 46 as needed.

To specify to the engine control computer of vehicle 44 the composition of fuel to be added to the fuel tank thereof, one simply pivots moveable member 42 in a counterclockwise direction as shown, and engages detent 54 of moveable member 42 with whichever one of detent holes 52 corresponds to the composition of fuel to be added to vehicle 44. The engine control computer will have been preprogrammed to recognize, for example, that the engagement of detent 54 of moveable member 42 with the detent hole 52 corresponding to "E10," as illustrated in FIG. 5, means that a fuel having 10% ethanol and 90% gasoline will be added to the fuel tank of vehicle 44.

Means are preferably included with fuel specifying apparatus 40 for ensuring that the composition of fuel to be added to the fuel tank of vehicle 44 is specified to its engine control computer before the fuel is added. Such means include rotary spring 56 attached to moveable member 42 at its pivotal mounting point for holding moveable member 42 in an initial position (shown in phantom lines) to impede the removal of fuel cap 46 unless and until the composition of fuel to be added is specified to the engine control computer. The ensuring means preferably further includes printed message 58 indicating that the composition of fuel to be added must first be specified to the engine control computer before adding fuel.

Fuel specifying apparatus 40 preferably includes means to return moveable member 42 to its initial position impeding the removal of fuel cap 46 following the addition of fuel to the fuel tank of vehicle 44. In this regard, detent hole plate 50 can be made to flex away from moveable member 42 sufficiently to allow detent 54 of moveable member 42 to disengage from detent holes 52. Once detent 54 has disengaged from one of detent holes 52, spring 56 causes moveable member 42 to return to its initial position impeding the removal of fuel cap 46. Detent hole plate 50 can be made sufficiently flexible in any known manner such as by mounting it upon a hinge spring attached to vehicle 44, or by constructing it from flexible material. As shown in FIG. 5, detent hole plate 50 is constructed from flexible material and rigidly attached to vehicle 44.

Detent hole plate 50 can be caused to flex by attaching release plate 60 thereto and by mounting a release member on the refueling access door (as shown in FIG. 1) of vehicle 44. The release member can be made to impinge upon release plate 60 when the refueling access door is closed in such a manner that detent hole plate 50 flexes sufficiently to allow detent 54 to disengage from detent holes 52. Thus, after fuel has been added to the fuel tank of vehicle 44 and the refueling access door thereof has been closed, moveable member 42 will disengage from detent hole plate 50 and return to its initial position impeding the removal of fuel cap 46.

Referring now to FIG. 6, a third embodiment of the present fuel specifying apparatus is illustrated. In accordance with this third embodiment, fuel specifying apparatus 62 includes moveable member 64 pivotably mounted upon vehicle 66 adjacent fuel cap 68, and means for specifying to the engine control computer of vehicle 66 the composition of fuel added to the fuel tank thereof by varying the position of moveable member 64. Generally, an electrical signal is transmitted to the engine control computer which varies in accordance with the position of moveable member 64. Moveable member 64 can be placed in predetermined positions, each of which corresponds to different predetermined fuel composition types such that a distinctive fuel identifying signal is transmitted to the engine control computer of vehicle 66 for each fuel composition type selected.

As illustrated, moveable member 64 is pivotably and translationally mounted to linear motion potentiometer 70 in such a manner that the ratio of resistance from the wiper (not shown) of linear motion potentiometer 70 to the low potential terminal thereof (not shown), to the total resistance of linear motion potentiometer 70 varies with the translational position of moveable member 64. An electrical current flows through linear motion potentiometer 70 and the wiper voltage is applied to an interface circuit for the engine control computer of vehicle 66. This voltage will be different for each translational position of moveable member 64 since the resistance ratio of linear motion potentiometer 70 will similarly be different. In this manner, the engine control computer of vehicle 66 can be preprogrammed to recognize different fuel composition types based upon the translational position of moveable member 64.

Means for positioning moveable member 64 in predetermined translational positions corresponding to different fuel composition types are provided by detent hole plate 72, detent holes 74, and detent 76 (shown in phantom line) affixed to the underside of moveable member 64. Detent hole plate 72 is attached to vehicle 66 adjacent fuel cap 68 and contains a plurality of detent holes 74. Each detent hole 74 corresponds to a specific fuel composition type. As shown in FIG. 6, four different blends of methanol and gasoline, four different blends of ethanol and gasoline, and pure gasoline, all with corresponding detent holes, are provided on detent hole plate 72. The number or type of fuel compositions which can be used with the present fuel specifying apparatus, however, can vary from those illustrated as desired.

To specify to the engine control computer of vehicle 66 the composition of fuel to be added to the fuel tank thereof, one pivots moveable member 64 in a clockwise direction as shown, translates moveable member 64 to the right or to the left along detent hole plate 72, and engages detent 76 of moveable member 64 with whichever one of detent holes 74 corresponds to the composition of fuel to be added to vehicle 66. The engine control computer will have been preprogrammed to recognize, for example, that the engagement of detent 76 of moveable member 64 with the detent hole 74 corresponding to "GAS" (as illustrated in FIG. 6) means that a fuel having 100% gasoline will be added to the fuel tank of vehicle 66.

Means are preferably included with fuel specifying apparatus 62 for ensuring that the composition of fuel to be added to the fuel tank of vehicle 66 is specified to its engine control computer before the fuel is added. Such means may include rotary spring 78 attached to moveable member 64 at its pivotal mounting point for holding moveable member 64 in an initial position (shown in phantom lines) to impede the removal of fuel cap 68 unless and until the composition of fuel to be added is specified to the engine control computer. In addition, a pair of opposing linear springs 80 may be attached to moveable member 64 on either side of the pivot point thereof to hold it in the home position shown in FIG. 6. The ensuring means may further include a printed message in the vicinity of fuel cap 68, such as on moveable member 64, indicating that the composition of fuel to be added must first be specified to the engine control computer before adding fuel.

Fuel specifying apparatus 62 preferably includes means to return moveable member 64 to its initial position impeding the removal of fuel cap 68 following the addition of fuel to the fuel tank of vehicle 66. In this regard, detent hole plate 72 can be made to flex away from moveable member 64 sufficiently to allow detent 76 of moveable member 64 to disengage from detent holes 74. Once detent 76 has disengaged from one of detent holes 74, rotary spring 78 and opposing linear springs 80 cause moveable member 64 to return to its initial position impeding the removal of fuel cap 68. Detent hole plate 72 can be made sufficiently flexible in any known manner such as by mounting it upon a hinge spring attached to vehicle 66, or by constructing it from flexible material. As shown in FIG. 6, detent hole plate 72 is mounted on hinge spring 82 which, in turn, is attached to vehicle 66. Detent hole plate 72 can be caused to flex by mounting a release member on the refueling access door (as shown in FIG. 1) of vehicle 66. The release member can be made to impinge upon detent hole plate 72 when the refueling access door is closed in such a manner that detent hole plate 72 flexes sufficiently to allow detent 76 to disengage from detent holes 74. Thus, after fuel has been added to the fuel tank of vehicle 66 and the refueling access door thereof has been closed, moveable member 64 will disengage from detent hole plate 72 and return to its initial position impeding the removal of fuel cap 68.

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. A fuel specifying apparatus for a vehicle having an internal combustion engine, an engine control computer, and a fuel tank with an inlet thereto and a fuel cap covering said inlet, comprising:

means, mounted upon said vehicle, for manually specifying the composition of fuel to be added to said fuel tank;

means for transmitting to said engine control computer said manually specified composition of fuel to be added to said fuel tank; and means for ensuring that the composition of fuel to be added to said fuel tank is specified to said engine control computer before said fuel is added to said fuel tank, said ensuring means including means for interfering with fuel additions to said fuel tank unless and until the composition of fuel to be added is specified to said engine control computer, said interfering means comprising means for impeding the removal of said fuel cap, said impeding means becoming non-impeding upon specifying to said vehicle engine control computer the composition of fuel to be added to said fuel tank.

2. A fuel specifying apparatus for a vehicle capable of accepting fuels of differing composition, said vehicle having an internal combustion engine, an engine control computer, and a fuel tank provided with an inlet and a fuel cap at said inlet, said fuel specifying apparatus comprising:

a plurality of push button actuators mounted on said vehicle near said fuel cap, each said actuator corresponding to a predetermined fuel composition type and causing, when activated, a distinctive electrical signal to be transmitted to said engine control computer; and means for ensuring that the composition of fuel to be added to said fuel tank is specified to said engine control computer before said fuel is added to said fuel tank, said ensuring means including a moveable member movably attached to said vehicle adjacent said fuel cap, said moveable member being initially positioned to impede the removal of said fuel cap, means for holding said moveable member in said initial position to impede the removal of said fuel cap unless and until the composition of fuel to be added to said fuel tank is specified to said engine control computer, and means for causing said moveable member to become non-impeding to removal of said fuel cap upon specification of the composition of fuel to be added to said engine control computer.

3. The fuel specifying apparatus of claim 2 wherein said holding means comprises a spring attached to said moveable member which is compressed when said moveable member becomes non-impeding to removal of said fuel cap.

4. The fuel specifying apparatus of claim 2 wherein said means for causing said moveable member to become non-impeding comprises:

a solenoid attached to said moveable member, said solenoid being energized upon activation of one of said actuators to cause said moveable member to move clear of said fuel cap; and a latch for holding said moveable member clear of said fuel cap during refueling of said vehicle.

5. The fuel specifying apparatus of claim 4 wherein said ensuring means further comprises means to return said moveable member to said initial position to impede the removal of said fuel cap following the addition of fuel to said fuel tank.

6. The fuel specifying apparatus of claim 5 wherein said returning means comprises:
   a refueling access door mounted to said vehicle which opens to provide access to said fuel cap; and
   a release member attached to said access door for impinging upon said latch when said access door is closed, said impingement causing said latch to release said moveable member;
   whereby said spring causes said moveable member to return to said initial position to impede the removal of said fuel cap.

7. A fuel specifying apparatus for a vehicle capable of accepting fuels of differing composition, said vehicle having an internal combustion engine, an engine control computer, and a fuel tank provided with an inlet and a fuel cap at said inlet, said fuel specifying apparatus comprising:
   a moveable member pivotally attached to said vehicle adjacent said fuel cap; and
   means for specifying to said engine control computer the composition of fuel added to said fuel tank by varying the position of said moveable member.

8. The fuel specifying apparatus of claim 7 wherein said specifying means comprises:
   means for transmitting an electrical signal to said engine control computer which varies in accordance with the position of said moveable member; and
   means for positioning said moveable member in predetermined positions, each of which corresponds to a different predetermined fuel composition type;
   whereby, a distinctive fuel identifying signal is transmitted to said engine control computer for each fuel composition type selected.

9. The fuel specifying apparatus of claim 8 wherein said means for transmitting a variable electrical signal is a potentiometer having a variable resistance ratio, said potentiometer being in contact with said moveable member such that the resistance ratio of said potentiometer varies with the position of said moveable member.

10. The fuel specifying apparatus of claim 9 wherein said potentiometer is a rotary potentiometer and said moveable member is pivotably mounted thereto such that the resistance ratio of said rotary potentiometer varies with the rotational position of said moveable member.

11. The fuel specifying apparatus of claim 9 wherein said potentiometer is a linear motion potentiometer and said moveable member is translationally mounted thereto such that the resistance ratio of said linear motion potentiometer varies with the translational position of said moveable member.

12. The fuel specifying apparatus of claim 8 wherein said means for positioning said moveable member in predetermined positions comprises:
   a detent hole plate attached to said vehicle adjacent said fuel cap, said detent hole plate having a plurality of detent holes;
   a detent attached to said moveable member for engaging said moveable member with one of said detent holes such that said moveable member assumes a specific position for each detent hole engaged; and
   a plurality of fuel composition indications fixed to said detent hole plate, each indication corresponding to one of said detent holes and also corresponding to a predetermined fuel composition type.

13. The fuel specifying apparatus of claim 12 further comprising means for ensuring that the composition of fuel to be added to said fuel tank is specified to said engine control computer before said fuel is added to said fuel tank.

14. The fuel specifying apparatus of claim 13 wherein said ensuring means includes at least one spring attached to said moveable member for holding said moveable member in an initial position to impede the removal of said fuel cap unless and until the composition of fuel to be added is specified to said engine control computer.

15. The fuel specifying apparatus of claim 14 wherein said ensuring means further comprises means to return said moveable member to said initial position to impede the removal of said fuel cap following the addition of fuel to said fuel tank.

16. The fuel specifying apparatus of claim 15 wherein said returning means comprises means for flexing said detent hole plate away from said moveable member sufficiently to disengage said detent of said moveable member from said detent holes, whereby said spring causes said moveable member to return to said initial position to impede the removal of said fuel cap.

17. The fuel specifying apparatus of claim 16 wherein said means for flexing said detent hole plate includes a refueling access door mounted to said vehicle which opens to provide access to said fuel cap, said access door having a release member attached thereto for impinging upon and flexing said detent hole plate when said refueling access door is closed.

* * * * *